United States Patent [19]

Ferry et al.

[11] Patent Number: 4,562,525
[45] Date of Patent: Dec. 31, 1985

[54] DC POWER SUPPLY CIRCUIT FOR LINE INTERFACE CIRCUITS

[75] Inventors: Michel F. M. S. Ferry, Vallauris; Jacques L. Trehin, Nice, both of France

[73] Assignee: International Business Machines Corporation, Armonk, N.Y.

[21] Appl. No.: 629,286

[22] Filed: Jul. 9, 1984

[30] Foreign Application Priority Data

Jul. 11, 1983 [EP] European Pat. Off. ........ 83430021.2

[51] Int. Cl.[4] .................... H02M 1/14; H04M 1/74
[52] U.S. Cl. .................................. 363/45; 323/281; 179/70; 179/77
[58] Field of Search ............... 323/280, 281, 365, 367; 363/45, 46; 179/16 AA, 16 F, 18 FA, 70, 77, 170 D, 170 NL

[56] References Cited

U.S. PATENT DOCUMENTS 4,007,335  2/1977  Hetherington et al. ........ 179/16 AA
4,476,350  10/1984  Aull et al. ......................... 179/70
4,514,595  4/1985  Rosenbaum et al. ........... 179/16 AA

OTHER PUBLICATIONS

"Balanced Electronic Receiver for Loop Signaling", D. Fischbuch et al., Electrical Communications, vol. 44, No. 4, 1969, pp. 340-347, London.

Primary Examiner—Peter S. Wong
Assistant Examiner—Judson H. Jones
Attorney, Agent, or Firm—John B. Frisone

[57] ABSTRACT

A circuit for supplying direct current to a line (a, b) from a battery via two supply resistors (RA, RB). Part of the current supplied by the battery flows in a secondary path including a resistor (R4) and a transistor (16), and is maintained at a constant value. A symmetrical and differential resistance bridge connected between the supply resistors and the line detects the transverse alternating current flowing into the battery, and means (15) are provided to cause the transistor to generate a negative-feedback alternating current whose value is adjusted to cancel said transverse alternating current.

8 Claims, 2 Drawing Figures

DC POWER SUPPLY CIRCUIT FOR LINE INTERFACE CIRCUITS

DESCRIPTION

1. Technical Field

This invention relates to DC power supply circuits and, more particularly, to such a circuit that lends itself to use in line interface circuits of the type that includes a transformer.

2. Background Art

Many telecommunication systems are known wherein a plurality of remote stations are connected to a processing or switching system via two-wire communication lines. In some of these systems, a private automatic branch exchange (PABX) or a public exchange (CX) is connected via two-wire telephone lines to subscriber telephone sets or to data stations or to other PABXs or CXs through a circuit known as a line interface circuit.

As used, for example, in a PABX, a line interface circuit is supplied with direct current via the attached telephone line if the far end thereof is connected to a CX. As used in a PABX or a CX, a line interface circuit feeds direct current to the telephone line if the far end thereof is connected to a subscriber telephone set. Since the number of line interface circuits used in a telephone exchange is equal to the number of lines connected thereto, and since the number of lines may be considerable, these circuits account for a substantial portion of the overall cost of an exchange. The designers of line interface circuits are, therefore, trying to develop new ways of reducing the cost of the circuits while improving their effectiveness.

As is known to those skilled in the art, line interface circuits that are used as a DC source are of two types. The first of these includes a line transformer while the second type, developed more recently, uses semiconductor integrated circuits in lieu of line transformer.

A representative line interface circuit of the first type is described in French patent FR-A-2,380,652. In this circuit, the telephone exchange is coupled to the primary of a line transformer which has its secondary connected to the line. Each terminal of a battery is connected to a supply resistor, itself connected to one of the wires of the line through a line resistor. The junction point between the line resistor and the supply resistor of one of the wires is directly connected to the secondary of the transformer while the junction point between the line resistor and the supply resistor of the other wire is connected to the primary of the transformer through a resistor and a capacitor. This very simple circuit has many advantages, but includes no means of preventing the AC signals present on the line from reaching the battery, thereby creating a crosstalk problem between the lines connected thereto.

A typical line interface circuit that includes no transformer is described in French patent FR-A-2,416,600. This circuit, which includes a number of interconnected semiconductor components, is too complex to be conveniently discussed here, but seems promising as it could be fully integrated and would, consequently, be comparatively inexpensive. However, one of its disadvantages is that no isolation is provided between the line and the telephone exchange.

DISCLOSURE OF THE INVENTION

It is an object of this invention to provide a simple DC power supply circuit that exhibits a very high impedance to alternating currents generated by the device to be fed by said circuit.

It is another object of the invention to provide a battery feed circuit for a line interface circuit comprising a transformer, wherein the battery is isolated from AC signals present on the line.

Generally, the invention provides a DC power supply circuit that includes a pair of output terminals connected to the device to which direct current is to be fed, a DC voltage source including a first and a second terminals, a first resistor a first end of which is connected to said first terminal and the second end of which is connected to one of said output terminals, and a second resistor a first end of which is connected to said second terminal of said DC voltage source and the second end of which is connected to the other one of said output terminals. The circuit of the present invention is characterized in that it includes:

- a secondary DC path provided between said second ends of said first and second resistors, and in which a current generator is inserted,
- means for maintaining the direct current flowing in said secondary path at a constant value,
- detection means for measuring the alternating current flowing between said output terminals and in the device to be supplied with direct current, and
- control means connected to said detection means for controlling said current generator to cause a negative-feedback alternating current to flow in said secondary path, and for adjusting the value of the latter current to cancel the alternating current flowing between said output terminals.

According to a first aspect of the invention, said secondary path includes a third resistor and said means for maintaining the direct current at a constant value includes a reference voltage source and means for maintaining the voltage across said third resistor at the reference value.

According to another aspect of the invention, said detection means comprises a symmetrical and differential resistance bridge that includes a fourth and a fifth resistors of identical value each of which is connected between one of said output terminals and said second end of each of said first and second resistors, and two cross-connected legs each including two resistors of identical value.

According to still another aspect of the invention, said reference voltage source consists of a diode connected in the forward direction between said second end of the first resistor and said resistance bridge.

According to yet another aspect of the invention, the device to which current is to be supplied includes a two-wire line connected between said output terminals, and a transformer a first winding of which is connected to said output terminals through a capacitor and the second winding of which is connected to a switching network.

DETAILED DESCRIPTION OF THE INVENTION

Figure 1:
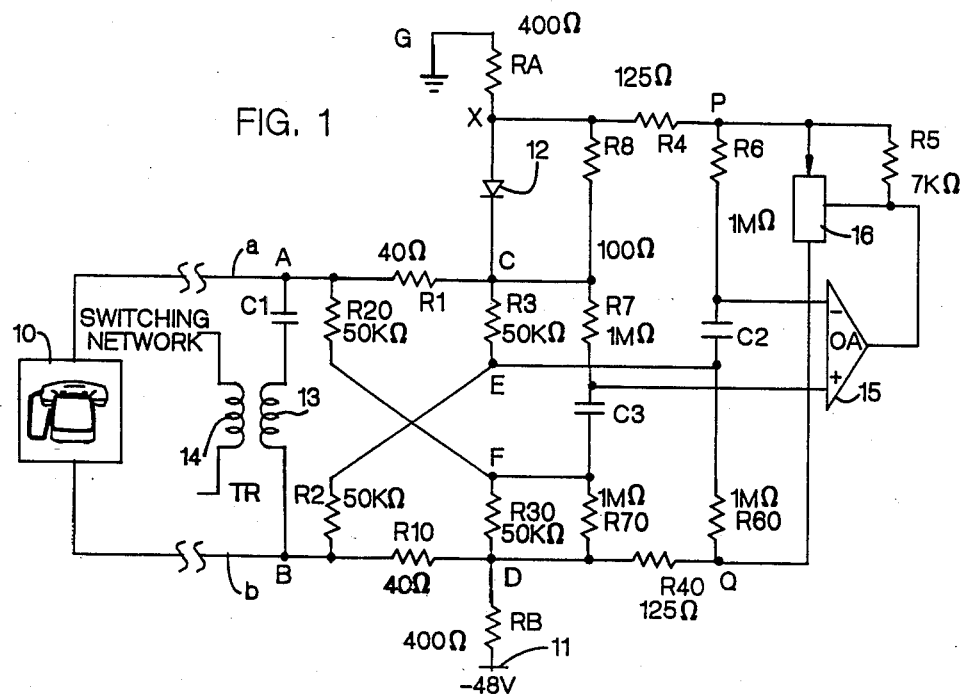
FIG. 1 illustrates an exemplary embodiment of a line interface circuit incorporating the invention.

Referring now to FIG. 1, there is shown an exemplary embodiment of a subscriber line interface circuit that incorporates the current-supplying circuit of the invention and connects a subscriber telephone set 10 to the switching network of a telephone exchange.

The telephone set 10 is connected to output terminals A and B of the current supply circuit via wires a and b (sometimes called tip and ring sides, respectively) of a subscriber line. Current is supplied to telephone set 10 by a battery which has its positive and negative sides respectively connected to a ground connection G and to a terminal 11. Typically, the battery can supply a potential of 48 volts. A supply resistor RA has one of its ends connected to ground G while its other end is connected to wire a through a diode 12 connected in the forward direction and a resistor R1. A supply resistor RB of the same value as RA has one of its ends connected to negative terminal 11 while its other end is connected to wire b through a resistor R10 of the same value as R1. Output terminal A is connected through a capacitor C1 to one of the terminals of the primary 13 of a line transformer TR. The other terminal of primary 13 is connected to output terminal B. The secondary 14 of transformer TR is connected to the switching network of the telephone exchange. Capacitor C1 prevents the current generated by the battery from flowing in the primary 13, so that transformer TR cannot saturate and, consequently, may be of small size. Output terminal B is connected to node C, located between diode 12 and resistor R1, through a pair of series-connected resistors R2 and R3. Similarly, terminal A is connected to node D, located between resistors RB and R10, through a pair of series-connected resistors R20 and R30. All of resistors R2, R3, R20, R30 have the same value. Resistors R1, R2, R3, R10, R20 and R30 from a symmetrical and differential bridge with cross-connected legs. Node E between R2 and R3, and node F between R20 and R30 constitute the differential output of the bridge and are respectively connected, through a pair of coupling capacitors C2 and C3, to the inverting and non-inverting inputs of an operational amplifier (OA) 15, whose output controls a current generator which, in the illustrated example, is comprised of a PNP transistor 16 whose base is connected to the output of operational amplifier 15. The emitter of transistor 16 is connected to node X, between supply resistor RA and diode 12, through a resistor R4, and its collector is connected to node D through a resistor R40 that has the same value as resistor R4. A resistor R5 is connected between the base and the emitter of transistor 16. Node P, between the emitter of transistor 16 and resistor R4, is connected to the inverting input of operational amplifier 15 through a resistor R6 of very high value. Node Q, between the collector of transistor 16 and resistor R40, is connected to node E through a resistor R60 that has the same value as R6. Node C is connected to the non-inverting input of operational amplifier 15 through a resistor R7 that also has the same value as R6. Node F is connected to node D through a resistor R70 that has the same value as R7. In a preferred embodiment, a resistor R8 is connected between the anode and the cathode of diode 12.

The operation of the interface circuit of FIG. 1 will now be described, assuming initially that resistor R8 does not exist. The presence of R8 in the interface circuit is an improvement that will be described later.

In operation, with subscriber telephone 10 in the off-hook condition, a battery current flows from ground connection G into power resistor RA and divides into a first and a second currents that respectively flow in diode 12 and resistor R4. The chosen value of resistors R2, R3, R20, R30 is high (e.g. 50 kilohms) with respect to the overall resistance of the subscriber line and telephone set, so that very little power is lost in the bridge comprised of resistors R1, R2, R3, R10, R20 and R30. As a result, almost all the current flowing in diode 12 is fed as line current IL to wire a, off-hook telephone set 10 and wire b, and returns to ground connection G via resistors R10 and RB, terminal 11 and the battery. The chosen overall value of resistors RA and R1 (and, therefore, of resistors RB and R10) is dependent upon the resistance of the subscriber line and telephone set and the desired value of line current IL. In the exemplary embodiment shown in FIG. 1, the chosen overall value is 440 ohms. Resistors R1 and R10 serve to measure the alternating currents flowing therein and are of low value. In the FIG. 1 embodiment, the chosen value of RA and RB is 400 ohms, and that of R1 and R10 is 40 ohms.

Operational amplifier 15 exhibits a very high input impedance that is further increased by resistor R6 whose value, as stated earlier, is very high (e.g. 1 megohm). Also, a very low current flows in resistor R5 which is used to bias the base of transistor 16 and whose value may be, for example, of 7 kilohms. Consequently, almost all the current flowing in resistor R4, and designated control current Ic hereafter, flows to terminal 11 via transistor 16, resistor R40 and supply resistor RB. Control current Ic is maintained at a value equal to a constant reference control current Io by the negative feedback X current created by operational amplifier 15 and transistor 16. This is achieved by causing the voltage drop across resistor R4 to remain equal to the reference voltage provided by the voltage drop across diode 12, and, since diode 12 has one of its ends connected to one of the ends of resistor R4 at node X, by causing the voltage at the other end of R4 (node P) to be equal to that at the other end of diode 12 (node C). The voltages at nodes C and P are respectively applied via high-value resistors R7 and R6 to the non-inverting and inverting inputs of operational amplifier 15. When control current Ic is equal to reference control current Io, the voltages at nodes P and C are equal, the differential voltage applied to the input of amplifier 15 is zero, and amplifier 15 draws a reference base current that holds transistor 16 at its steady-state operating point. When Ic is higher than Io, the voltage at node P is more negative than that at node C and operational amplifier 15 draws a base current whose value is less than that of the reference base current, less current flows in transistor 16, and the value of Ic decreases. When Ic is lower than Io, the voltage at node P is less negative than that at node C and amplifier 15 draws a base current whose value is higher than that of the reference base current, more current flows in transistor 16, and the value of Ic increases. The chosen value of resistor R4 is dependent upon the value of the reference voltage, which, in the exemplary embodiment, is the value of the voltage drop across diode 12, and upon the desired value of the reference control voltage Io. In the exemplary embodiment shown in the figure, the diode provides a reference voltage of 700 mv, and the chosen value of resistor R4 is 125 ohms. Resistors R40, R60 and R70, which are identical to resistors R4, R6 and R7, respectively, also serve to balance the circuit.

The line interface circuit receives two types of AC signals that are respectively called longitudinal and transverse signals. The former are spurious signals that mainly result from currents induced in the subscriber line by external electromagnetic fields; they appear as spurious voltages on both wires a and b of the subscriber line and vary by the same quantity with respect to ground. The transverse signals, on the other hand, are information-carrying signals transmitted from, or received by, subscriber telephone 10 and are in the form of a potential difference between wires a and b of the subscriber line.

Since longitudinal signals are spurious signals, the interface circuit must be able to eliminate or at any rate reduce their effects. Such signals must neither be transmitted to the switching network nor be allowed to interfere with the operation of the interface circuit.

Let $v_1$ be the voltage produced by longitudinal signals on each of wires a and b. Voltage $v_1$ is present on both terminals of the primary 13 of transformer TR and, therefore, creates no spurious potential difference across the primary. This spurious voltage is not transferred to the switching network which is connected to the terminals of the secondary of transformer TR.

Spurious voltage $v_1$ creates a spurious voltage $v'_1$ at nodes C and D but does not affect the potential difference between these nodes. Thus, the DC supply to the input line is not affected. What is obtained is a floating circuit that is not perturbed by high-amplitude longitudinal signals. Since the bridge comprised of resistors R1, R2, R3, R10, R20 and R30 is symmetrical, the spurious voltage $v_1$ at each of nodes A and B creates no spurious potential difference between nodes E and F and thus has no effect on operational amplifier 15 and, consequently, on the regulation of control current Ic.

In addition to eliminating the effects of the longitudinal signals as described above, the line interface circuit must transfer the transverse signals from the telephone set 10 to the switching network and vice versa. Also, the circuit must exhibit a very high impedance to the transverse signals, mainly because, if such were not the case, some of the signals would be lost in the circuit, which would of course adversely affect transmissions between the telephone set and the switching network, while some other signals would reach the battery, thereby creating a crosstalk problem between the various subscriber lines connected thereto.

Still referring to FIG. 1, the transverse signals from the subscriber telephone are applied to the primary 13 of line transformer TR and transferred to the switching network by the secondary 14. Conversely, the transverse signals from the switching network are transferred to the telephone set via line transformer TR and the subscriber line.

In accordance with the invention, the interface circuit is made to simulate an infinite impedance by detecting the alternating current created by the transverse signals that is flowing in resistors R1 and R10, and by generating a negative feedback current $-i$ that is superimposed on current i in resistors R1 and R10 and cancels same.

Figure 2:
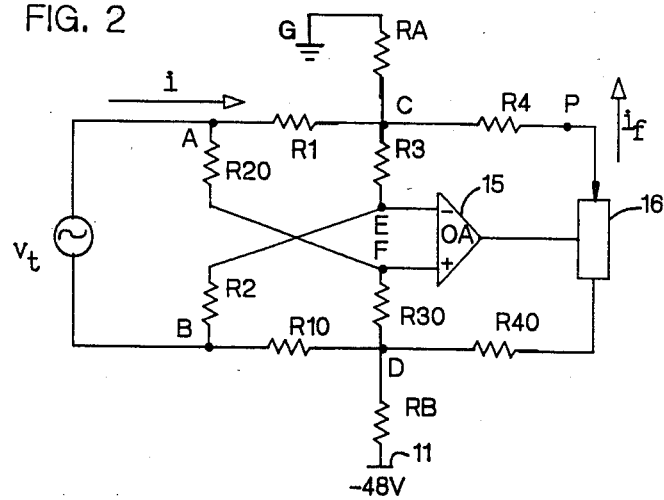
FIG. 2 is an AC circuit equivalent to the arrangement of FIG. 1.

The equivalent AC circuit of FIG. 2 should make it easier to understand the manner in which this negative feedback is generated and used. In the equivalent circuit, an AC voltage source $v_t$ connected between terminals A and B represents the transverse signals, and a current generator has been substituted for transistor 16. It will be assumed that voltage source $v_t$ creates a current i that flows from A to C in resistor R1 and from D to B in resistor R10. Current i develops between nodes E and F of the bridge comprised of resistors R1, R2, R3, R10, R20, R30 a control voltage that is applied to the two inputs of operational amplifier 15, thereby causing transistor 16 to generate a feedback current $i_f$ that flows from P to C in the secondary path comprising resistors R4 and R40 and transistor 16. A portion $i_{f1}$ of current $i_f$ is lost in the power resistor while another portion $i_{f2}$ thereof flows in resistors R1 and R10 in the opposite direction to current i. Thus, the resultant current flowing in R1 and R10 is a current $i-i_{f2}$. As long as the value of i is higher than that of $i_{f2}$, the control voltage at the input of operational amplifier 15 will be non zero and current $i_{f2}$ will increase. A steady-state condition is obtained when current $i_{f2}$ has the same amplitude as current i. At this point, no alternating current flows in resistors R1 and R10 and the impedance of the interface circuit to transverse signals is practically infinite.

The improvement that consists in adding resistor R8 to the circuit so that R8 and diode 12 are connected in parallel will now be described. When the subscriber telephone is on-hook, no current flows in the subscriber line, with the possible exception of some leakage currents. In the absence of resistor R8, a current flows in power resistor RA, diode 12, the resistance bridge and power resistor RB, while control current Ic flows in the secondary path comprising resistor R4, transistor 16 and resistor R40, both of which currents result in a loss of electrical energy. The object of resistor R8 when connected in parallel with diode 12 is to reduce this loss of energy. The chosen value of R8 is such that, when the subscriber telephone is on-hook, that is, when the line current is less than a predetermined value, the voltage drop across R8 will cause diode 12 to remain nonconducting. For example, assume that R8 has a value of 100 ohms. Since diode 12 is off, a current flows from ground connection G to negative terminal 11 via the bridge comprising resistors R1, R2, R3, R10, R20, and R30, and via resistor RB. Considering the values of resistors RA, RB, R8 and of those in said bridge, this current will have a value of approximately 1 ma, causing a voltage drop of 100 mv across diode 12, and the secondary circuit including amplifier 15 and transistor 16 will hold control current Ic at a value such that the voltage across resistor R4 will also be equal to 100 mv. The value of control current Ic is than less than 1 ma.

Thus, the presence of parallel-connected resistor R8 reduces to a substantial extent the loss of energy that occurs in the interface circuit when the subscriber telephone is on-hook. In that case, the voltage drop across resistor R8 exceeds the conduction threshold of diode 12, which is conductive and short-circuits resistor R8.

While a line interface circuit incorporating the current-supplying circuit of the invention has been described with reference to FIGS. 1 and 2, it will be understood by those skilled in the art that the use of the latter circuit is by no means restricted to line interface circuits.

We claim:

1. A DC supply circuit comprising a first and a second output terminals (A and B) connected to the device to which current is to be fed, a DC voltage source including a first (G) and a second (11) terminals, a first resistor (RA) a first end of which is connected to said first terminal (G) of said DC voltage source and the second end (X) of which is connected to said first one (A) of said output terminals, and a second resistor (RB) a first end of which is connected to said second terminal (11) of said DC voltage source, and the second end of which is connected to said second one (B) of said output terminals, characterized in that it includes:

a secondary DC path (R4, 16, R40) connected between said second ends of said first and second resistors, and in which a current generator (16) is inserted, means (12, 15, R4, 16) for maintaining the direct current (Ic) flowing in said secondary path at a constant value, detection means (R1, R10, R2, R20, R3, R30) for measuring the alternating current flowing between said output terminals and in the device to be supplied with direct current, and control means (C2, C3, 15) connected to said detection means for controlling said current generator to cause a negative-feedback alternating current to flow in said secondary path, and for adjusting the value of the latter current so as to cancel said alternating current flowing between said output terminals.

2. A DC power supply circuit according to claim 1, characterized in that said secondary DC path includes a third resistor (R4) and in that said means for maintaining the direct current at a constant value includes a reference voltage source (12) and means (R6, R7, 15) for maintaining the voltage across said third resistor at a value equal to said reference voltage.

3. A DC power supply circuit according to claim 1 or 2, characterized in that said detection means includes a symmetrical and differential resistance bridge including a fourth (R1) and a fifth (R10) resistors of identical value each of which is connected between one of said output terminals (A, B) and said second end of each of said first and second resistors (RA, RB), and two cross-connected legs including each two resistors of identical value.

4. A DC power supply circuit according to claim 3, characterized in that said control means includes:
an operational amplifier (15), and
a first and a second capacitors (C3, C4) for respectively coupling the two centers of said cross-connected legs to the inputs of the operational amplifier.

5. A DC power supply circuit according to claim 3, characterized in that said reference voltage source consists of a diode (12) connected in the forward direction between said second end of the first resistor and the resistance bridge.

6. A DC power supply circuit according to claim 5, characterized in that it includes a sixth resistor (R8) connected in parallel with said diode (12).

7. A DC power supply circuit according to claim 2, characterized in that said secondary path includes a seventh resistor (R40) whose value is the same as that of said third resistor (R4).

8. A DC power supply circuit according to any one of claims 1, 2 or 7, characterized in that the device to be supplied with direct current includes:
a two-wire line, each of said wires (a, b) being connected to one of said output terminals, and
a transformer (TR) having a first winding coupled to said output terminals through a third capacitor, and a second winding coupled to a switching network.

* * * * *